United States Patent [19]
Peterson et al.

[11] Patent Number: 6,112,135
[45] Date of Patent: Aug. 29, 2000

[54] APPLIANCE CONTROL SYSTEM

[75] Inventors: Gregory A. Peterson, South Barrington; Thomas A. Sheahan, Cary, both of Ill.

[73] Assignee: Emerson Electric Co., St. Louis, Mo.

[21] Appl. No.: 09/042,303

[22] Filed: Mar. 13, 1998

Related U.S. Application Data

[60] Provisional application No. 60/040,510, Mar. 13, 1997.

[51] Int. Cl.[7] .................................................. G05D 9/00
[52] U.S. Cl. ......................... 700/293; 700/274; 700/209
[58] Field of Search .................................... 700/211, 219, 700/274, 293, 71, 79; 126/19, 20, 21, 22; 219/391, 392; 236/46; 432/90, 91; 714/1, 2

[56] References Cited

U.S. PATENT DOCUMENTS

| | | | |
|---|---|---|---|
| 4,345,145 | 8/1982 | Norwood | 219/492 |
| 4,817,582 | 4/1989 | Oslin et al. | 126/21 |
| 4,851,644 | 7/1989 | Oslin | 219/400 |
| 5,324,918 | 6/1994 | Kadwell et al. | 219/506 |
| 5,378,874 | 1/1995 | Holling et al. | 219/506 |
| 5,534,678 | 7/1996 | Bowles et al. | 219/396 |

*Primary Examiner*—Joseph E. Palys
*Assistant Examiner*—Nitin Patel
*Attorney, Agent, or Firm*—Arnold White & Durkee

[57] ABSTRACT

A control system for preventing the occurrence of unsafe operating conditions on an appliance load comprises first and second switch elements coupled to said appliance load; first controller means coupled to said first switch element for detecting a first predetermined fault condition and producing a first fault detection signal in response to said detection of said predetermined fault condition, said first fault detection signal deactivating said first switch element and de-energizing said load; and second controller means coupled to said second switch element for detecting a second predetermined fault condition and producing a second fault detection signal in response to said detection of said predetermined fault condition, said second fault detection signal deactivating said second switch element and de-energizing said load.

16 Claims, 6 Drawing Sheets

APPLIANCE CONTROL SYSTEM

CROSS REFERENCES RELATED APPLICATIONS

This application claims the benefit of provisional application Ser. No. 60/040,510 filed on Mar. 13, 1997.

FIELD OF THE INVENTION

The invention relates to control systems for appliances. Specifically, the invention involves a control system having two or more processors and providing for shutdown of the appliance upon the detection of unsafe operating conditions by any processor.

BACKGROUND OF THE INVENTION

A key function of appliance control is to provide for the safe operation of the appliance, even when a component failure in the appliance occurs. The consequences of a failure of a component within the appliance can be potentially severe. Not only can a failure damage other parts within the appliance, but the failure can result in serious injury to the user of the appliance.

For example, in the context of an oven, one component failure can cause the oven's heating element to turn on without temperature control. Also, when the oven is in the self-clean mode of operation, a component failure may unlock the door to an oven which has been heated to a hazardous temperature. Obviously, the failure of one component must not be allowed to turn the oven's heating element on or unlock the oven door.

Current appliance controls are costly to produce and are constructed from many discrete components which makes a control system costly to manufacture. Current safety control features also do not provide redundant control arrangements. In other words, current control systems do not provide for the system to continue to operate and detect unsafe operating conditions when a central component of the safety system fails.

SUMMARY OF THE INVENTION

The system includes two or more microprocessors which are used to provide a fail-safe fault detection mechanism when component failure occurs. One microprocessor is an application processor and operates the appliance display, reads the appliance keyboard for inputs, provides the main control and logical operations of the system, and provides the safety enable outputs for the appliance loads. The other microprocessor is a peripheral processor which enables the relays that control the appliance loads, performs analog to digital conversion that allows for control and measurement of the temperature or other operating conditions of the appliance, and controls and reads the status of other safety features of the appliance such as the status of doors.

Both the application processor and the peripheral processor must activate electrical switching elements in order for the appliance's load to be energized. This ensures that any detected fault condition will cause either processor to de-energize the load.

Both processors communicate over a common bus which is connected to a nonvolatile memory and if there is a loss of communication between processors the loads will be de-energized. Additionally, either processor can deactivate the oven loads in order to prevent an unsafe operating condition. Thus, in contrast to current control systems, the current invention provides a dual control arrangement ensuring that if one processor is disabled, the load for the appliance will be deactivated preventing unsafe operating conditions from occurring.

As stated above, the application processor uses an analog-to-digital port to receive communication signals from the peripheral processor. This method allows the application processor to determine if the power supply voltages to the peripheral processor are within its acceptable limits. If the supply were outside the acceptable operating range, then the peripheral processor would not be able to perform an accurate analog-to-digital conversion and this could result in an unsafe oven temperature. Thus, the present invention provides for improved appliance safety. Additionally, the invention is constructed from fewer parts and is easier to manufacture and less costly to produce than current appliance controls.

DETAILED DESCRIPTION OF THE, PREFERRED EMBODIMENTS

Although the following description is in terms of a control system for an oven, it will be understood by those skilled in the art that it is applicable to all types of appliances including all types of ovens, refrigerators, freezers, garbage disposals, washers, dryers, and dishwashers.

Figure 1:
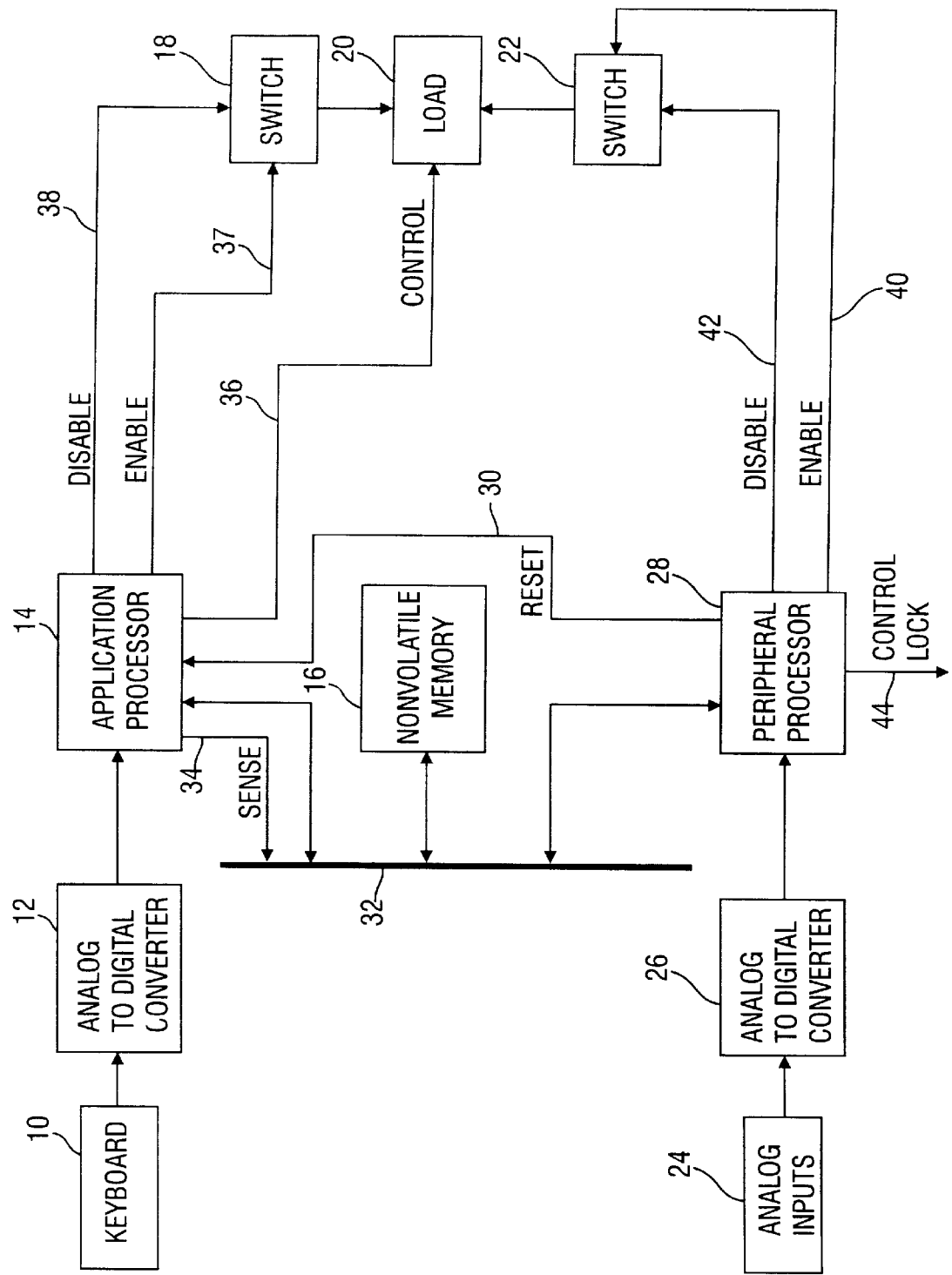
FIG. 1 is a block diagram of the control system according to principles of the present invention.

Referring now to FIG. 1, a user inputs commands into a keyboard 10. The keyboard is a typical keyboard present on the front of an oven and has keys which control the operation of that oven. The keys present on the keyboard 10 include keys that turn the oven on and off. Additionally, keys are present which operate the oven at particular settings. For example, the keyboard has controls to tell the oven to enter bake mode, self-cleaning mode, and defrost mode. Also, keys are pressed which operate mechanical features oven elements, for example, the opening and closing of the oven's door. Also present on the keyboard is a cancel key which halts the operation of the oven in the current mode the oven is operating. The voltage level of the keys is sensed by the application processor and used to determine if a fault is present on the keyboard 10. Additional keys can be used on the keyboard which direct the oven to operate in other modes.

The signals indicating a pressed key are transmitted from the keyboard 10 to an analog-to-digital converter 12. The purpose of the analog-to-digital converter 12 is to provide digital signals that are readable by application processor 14. Although shown as a separate element, the analog-to-digital conversion can be done internally at the application processor 14 if it is the type of microprocessor equipped for such a purpose.

The application processor 14 receives signals from the keyboard 10 through the analog-to-digital converter 12 and processes these signals. The processing results in a series of control signals being sent from the application processor 14 which directs the operation of the load 20 and other elements of the oven. The load 20 is a heating unit on an oven. The application processor is typically a 4-bit HD404316 processor manufactured by Hitachi Corporation or any other similar processor known to those skilled in the art.

The application processor 14 also receives signals representing information stored in a nonvolatile memory 16. The nonvolatile memory 16 transmits the information it stores over a data bus 32 which is coupled to the application processor 14. The information on the data bus 32 is in the form of digital signals with a logic one represented by 5 volts. The nonvolatile memory 16 stores information representing information specific to a particular oven. For example, the nonvolatile memory stores information representing various heat settings in the oven's modes of operation. This information is sent to the application processor 14 which uses this information together with the inputs from the keyboard 10 to properly operate the load 20 and to detect unsafe operating conditions.

The application processor 14 contains a sense pin 34 which determines the voltage level present on the data bus 32. The application processor 14 senses whether this voltage level is below a threshold value. If the value detected is below the threshold value, this indicates that the supply voltage to a peripheral processor 28 is outside of acceptable operating limits. If this were the case, the peripheral processor 28 would not be able to perform its functions correctly. The application processor also performs error checking on the signal as is known to those skilled in the art.

If the voltage level is below a threshold value, the application processor 14 sends a enable signal 37 turning on a current switch 18 which allows the load 20 of the oven to operate. As will be explained in greater detail below, it is necessary that the peripheral processor 28 to also transmit an enable signal 40 to enable another current switch 22 before the load 20 is allowed to be energized. In other words, both switches 18 and 22 must be enabled before the load 20 is energized.

The application processor 14 also sends a disable signal 38 which disengages the current switch 18 when unsafe oven conditions are detected. The unsafe oven conditions include the detection of a fault on the keyboard 10, the detection of a low voltage on the bus 32, or the detection of a communication time-out between the application processor 14 and the peripheral processor 28.

The application processor also receives a reset signal 30 from the peripheral processor 28. The purpose of the reset signal is to reset the application processor 14 on system power-up, or to indicate that communications between the application processor 14 and the peripheral processor 28 have been disrupted.

Analog inputs 24, such as a signal indicating the oven temperature and a signal indicting whether the oven door is open are sent to a analog-to-digital converter 26 which changes the analog voltage levels of the analog input signals from the oven into digital signals that are to be used by the peripheral processor 28. Although shown as a separate element, the analog-to-digital conversion can be done at a microprocessor if it is equipped for such a purpose.

The peripheral processor 28 operates to enable the operation of the load 20. The peripheral processors sends an enable signal 40 to the current switch 22 to close the current switch 22. It is necessary that both current switches 18 and 22 be closed in order that the load is energized. Thus, a shutdown condition detected by either the application processor 14 or the peripheral processor 28 causes the load to be de-energized.

The peripheral processor 28 receives the digital signals which are representative of the analog input signals 24 and processes the digital signals. The processor 28 compares the values of the signal ranges which are stored in the nonvolatile memory 16. For example, the peripheral processor 28 may measure the temperature of the oven and determine whether this temperature is in the range stored in the nonvolatile memory for a particular mode of oven operation. As will be explained in greater detail below, the peripheral processor sends a deactivation signal 42 to the current switch 22 which opens the switch and turns off the load, which as explained above, is typically the heating unit of an oven.

The peripheral processor 28 also senses whether the communication between the peripheral processor 28 and the application processor 14 has been disrupted. The peripheral processor 28 sends a disable signal 42 to the current switch which disengages the current switch 22 and de-energizes the load 20 of the oven.

The peripheral processor 28 also is coupled to the data bus 32 from which it transmits and receives information from the nonvolatile memory 16. Such data includes the operating parameters of the load 20. The peripheral processor 28 additionally transmits signals which control other features of the oven. For example, the peripheral processor 28 transmits a signal 44 which engages the lock on the door of the oven. Such control is a safety feature and is required in order that the door is not accidentally opened during the operation of the oven.

The peripheral processor 28 also controls the reset of the application processor 14. Upon system reset, for example, the peripheral processor transmits a reset signal 30 which resets and initializes the application processor 28. The reset signal is also transmitted when communication between the application processor 14 and the peripheral processor 28 has been disrupted. The peripheral processor 28 is preferably an 8-bit Z86C04 processor manufactured by Zilog, Inc. or any other similar processor known to those skilled in the art.

Thus, either the application processor via signal 36 or the peripheral processor 28 can deactivate the oven by opening the switches 18 and 22 respectfully. Such multiprocessor-structured control operates as a fail-safe mechanism to ensure that the failure of one component will not cause a safety hazard during the operation of the oven.

Figure 2A:
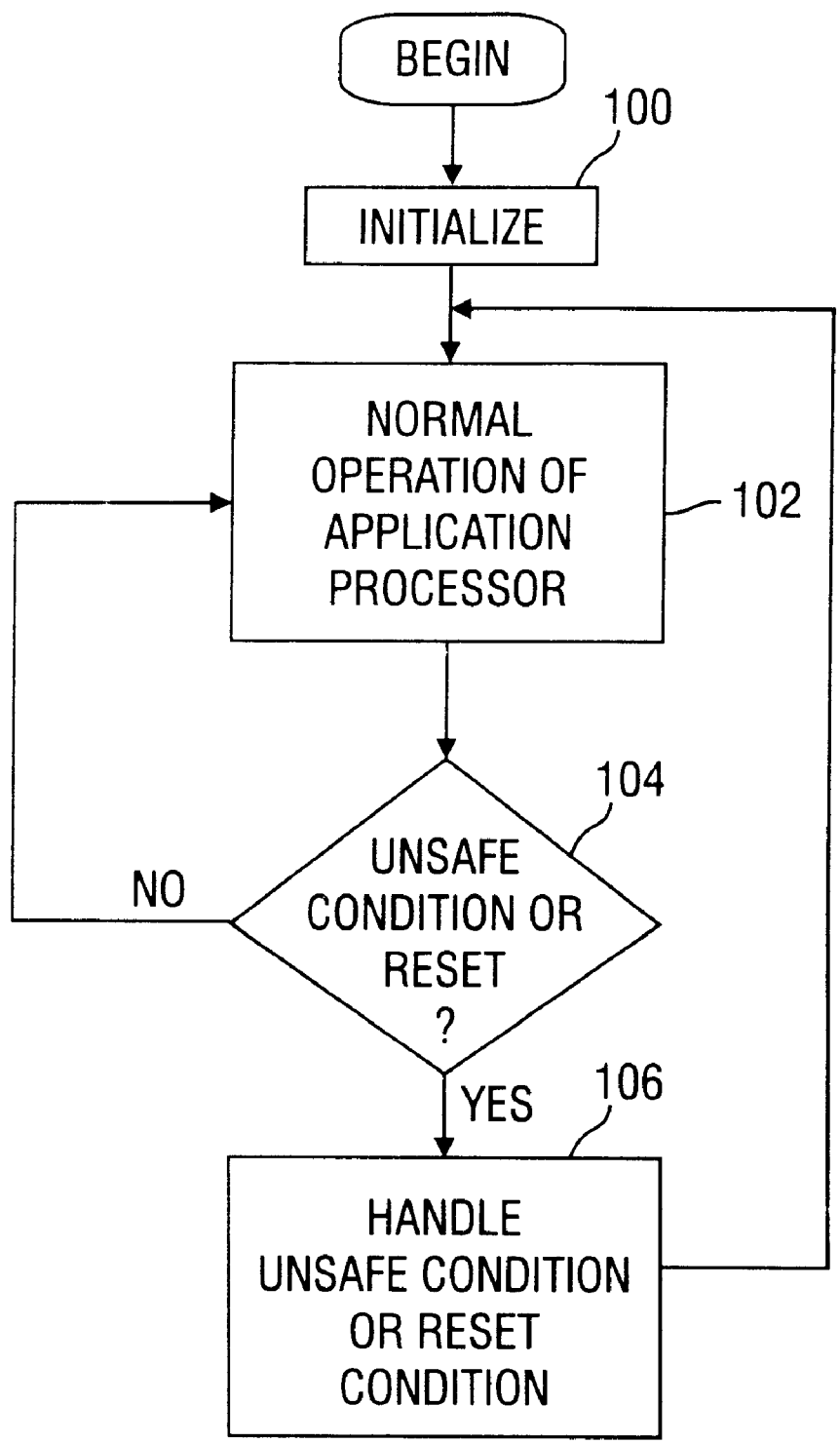
FIG. 2a is a flowchart of the general operation of the application processor according to principles of the present invention.

Referring now to FIG. 2a, the general operation of the application processor begins at step 100 where at power-up, reset occurs and all variables are cleared. Normal operation of the processor is executed next at step 102. This includes responding to keyboard requests with control signals which affect the operations of the oven. For example, if the user presses an on-button on the keyboard, then this is received by the application processor. Normal operation causes control signals to be sent from the microprocessor to activate the oven. Those skilled in the art will understand that there are many operations that the application processor will perform. For example, as is known in the art, a debounce module will debounce key releases. A valid debounced key will only be recognized after a valid debounced key release. Then, a look-up table can be used to decode the inputs received by the application's processor from the keyboard.

Next, at step 104, the application processor determines whether an unsafe operating condition has been detected.

This is detected by determining whether a fault is present on the keyboard, by determining that a loss of communication between the application processor and the peripheral processor has occurred, that the supply voltage on the data bus is above acceptable limits, or that reset has been detected. If the answer to step 104 is affirmative, then the system executes the shutdown detect algorithm at step 106 which is described in greater detail below. If the answer to step 104 is negative, then the application processor continues with step 100.

Figure 2B:
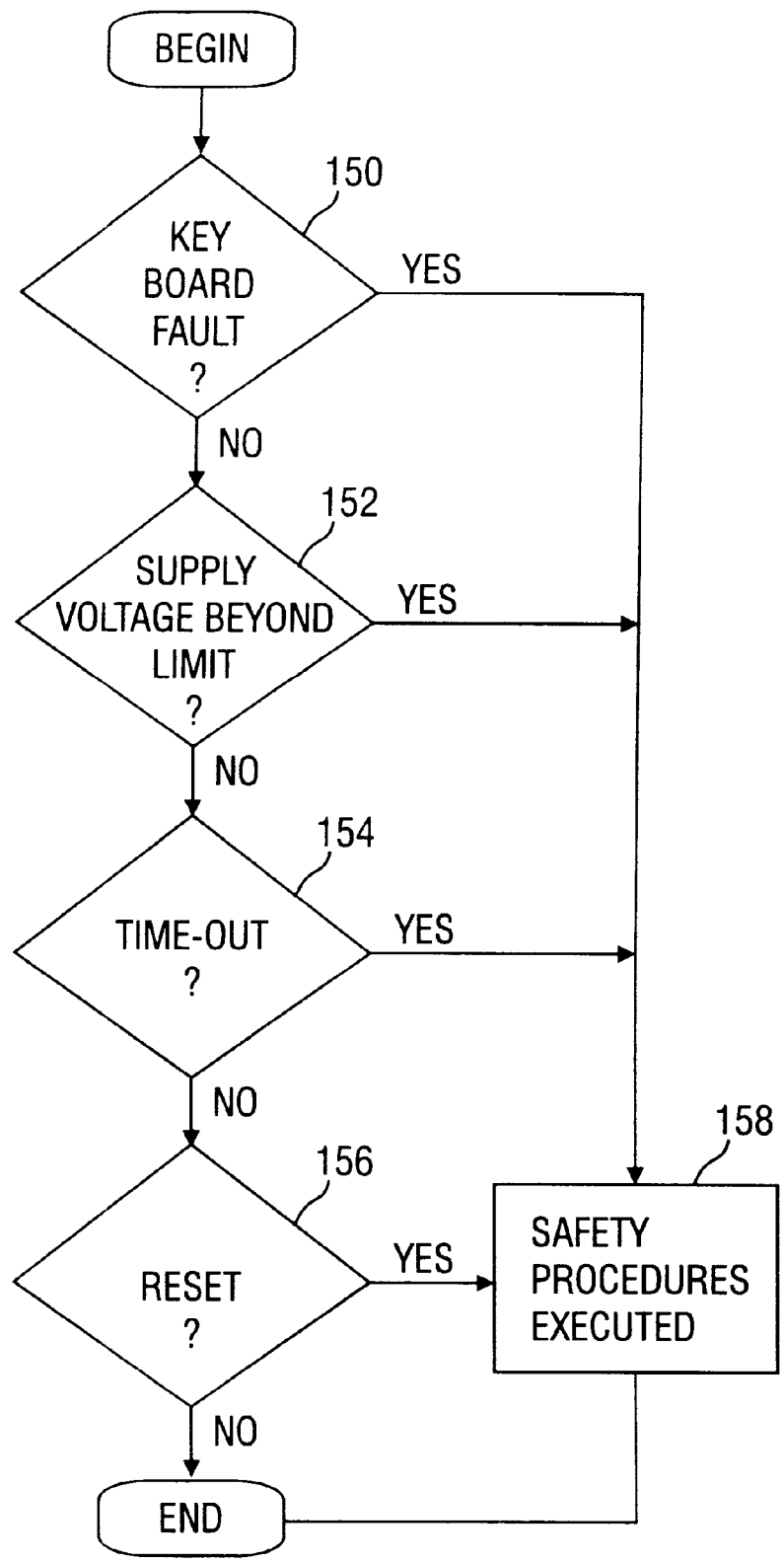
FIG. 2b is a flowchart of the operation of the safety shutdown features of the application processor according to principles of the present invention.

Turning now to FIG. 2b, the shutdown detect algorithm of the application processor begins at step 150 where the processor determines whether a fault is present at the keyboard. Underwriters Laboratory (UL) standards require, for example, that a fault present on the "cancel" button of the oven be detected and that the oven be deactivated if such a fault is detected.

If the answer to step 150 is affirmative, then the system continues with step 158 where safety procedures are initiated. These include opening the current switch which de-energizes the load. If the answer to step 150 is negative, then the system continues with step 152 where it tests whether the supply voltage is above acceptable limits. Normally, the bus will be 5 volts and a voltage of 3 volts will be indicative that the supply voltage to the peripheral processor is outside of normal operating limits. If the answer to step 152 is affirmative, then the application processor executes step 158, as described above. If the answer to step 152 is negative, then execution continues at step 154.

At step 154, the application processor determines whether a communication time-out between the application processor and the peripheral processor has occurred. The application processor periodically senses whether communication is present between the application processor and the peripheral processor. Upon the detection of no activity, a timer is started which, when upon time-out, indicates that communication between the application processor and the peripheral processor has been broken. If the answer at step 154 is affirmative, then control continues at step 158 as described above. If the answer to step 154 is negative, then control continues with step 156.

At step 156, the application processor determines whether a reset has been detected. If a reset has been detected the oven must be turned off. Reset occurs, for example, upon power-up of the system. If the answer at step 156 is affirmative, then the application processor executes step 158 as described above. If the answer to step 156 is negative, the routine halts.

Figure 3A:
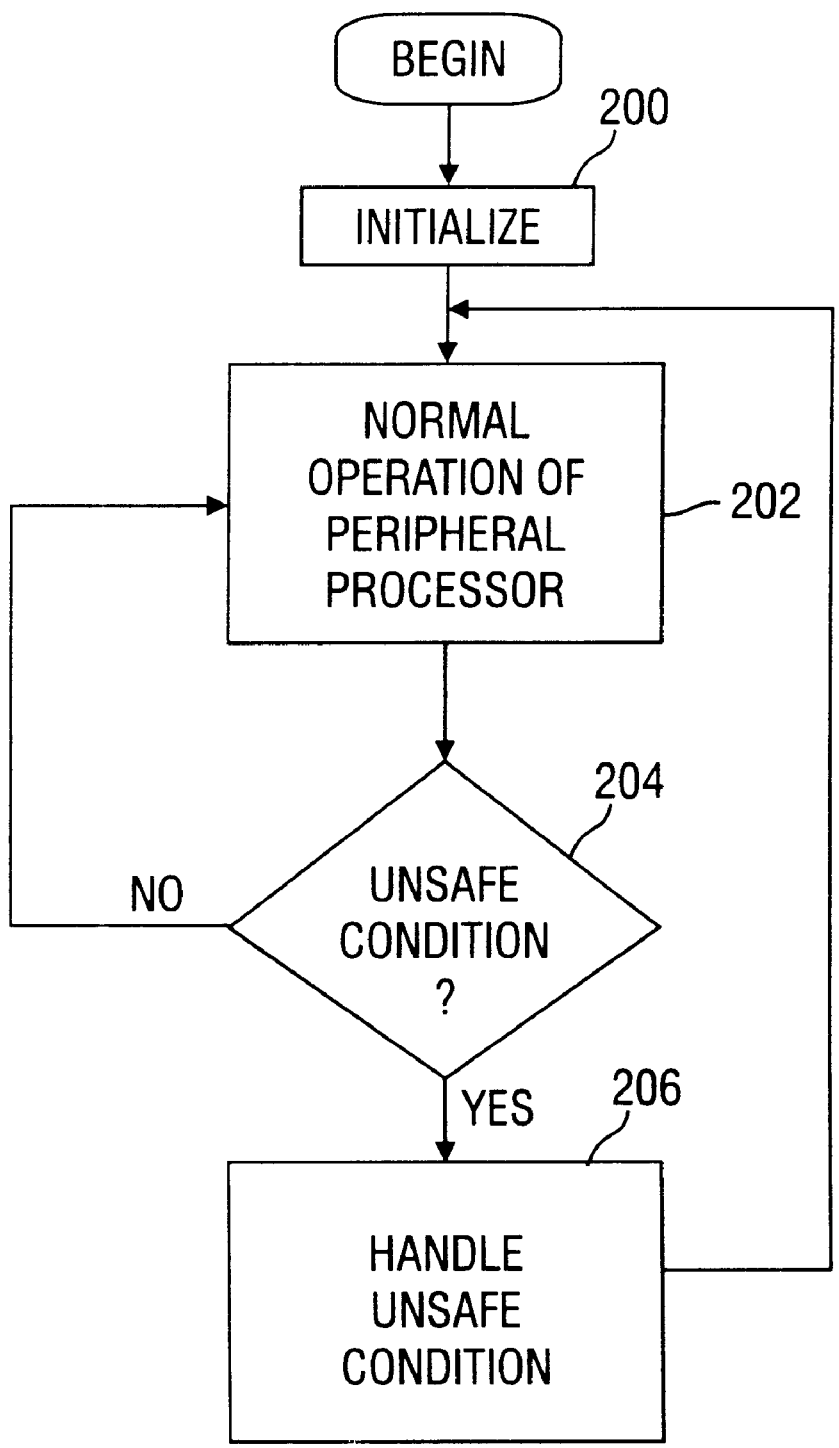
FIG. 3a is a flowchart of the general operation of the peripheral processor according to principles of the present invention.

Referring now to FIG. 3a, the general operation of the peripheral processor begins at step 200 where at power-up, reset occurs and all variables are cleared. Normal operation of the processor is executed next at step 202. This includes detecting the temperature and oven-door condition inputs from the oven. The peripheral processor also controls the lock mechanism on the oven, enables one of the current switches to allow the oven to operate, performs analog to digital conversion on the sensed oven temperature and controls the reset of the application processor.

Next, at step 204, the peripheral processor determines whether an unsafe operating condition has been detected. This is detected by determining whether the temperature is outside a set range, whether communication has been disrupted or whether a reset condition has occurred. If the answer to step 204 is affirmative, then the peripheral processor executes the shutdown detect algorithm at step 206 which is described below. If the answer to step 204 is negative, then the peripheral processor continues with step 202.

Figure 3B:
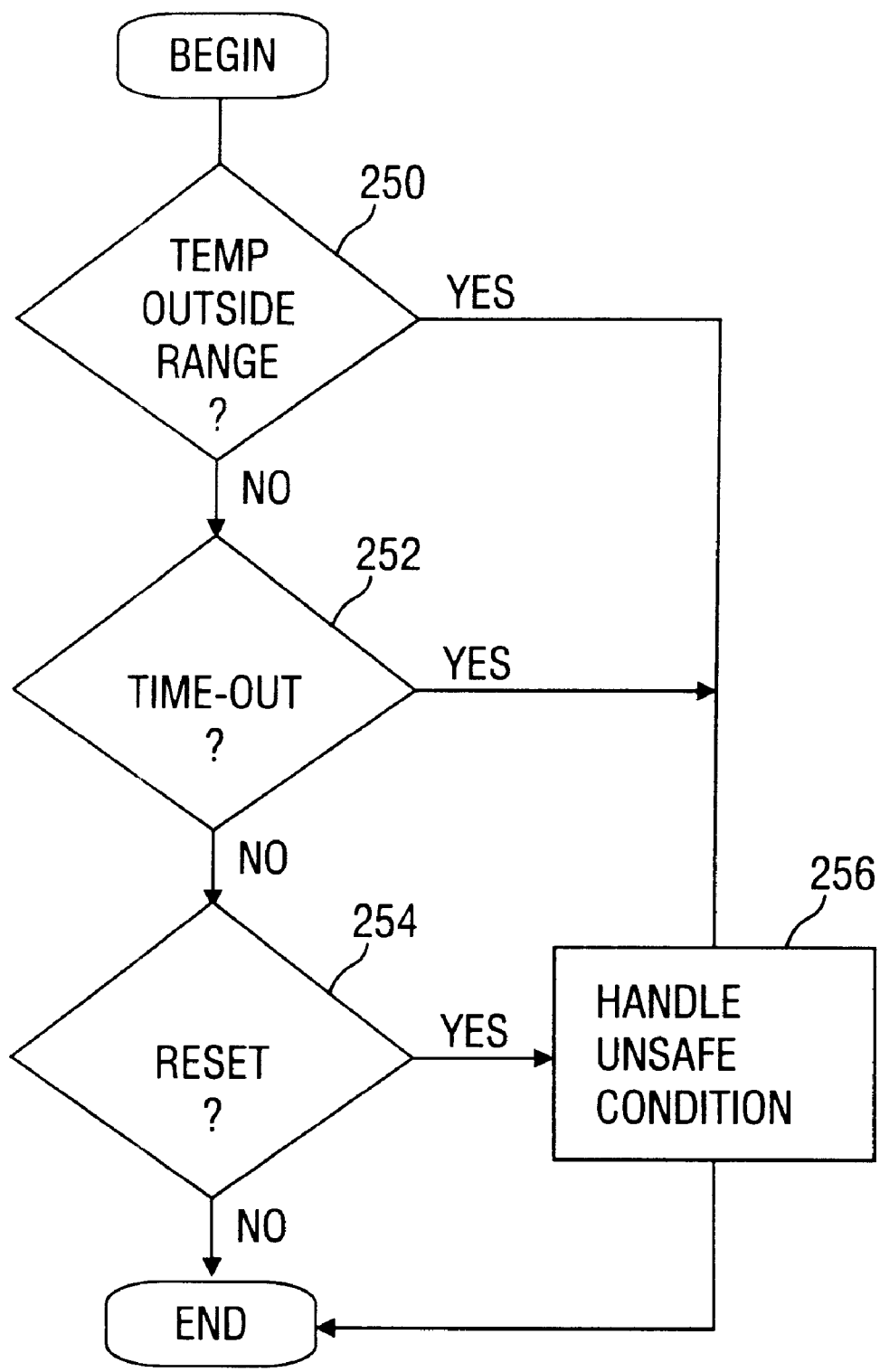
FIG. 3b is a flowchart of the operation of the safety shutdown features of the peripheral processor according to principles of the present invention.

Turning now to FIG. 3b, the shutdown detect algorithm of the peripheral processor begins at step 250 where the processor determines whether the temperature is outside the safe operating range. This range is preferable stored in the nonvolatile memory.

If the answer to step 250 is affirmative, then the peripheral processor continues with step 256 where safety procedures are initiated. These include opening the current switch which de-energizes the load. If the answer to step 250 is negative, then the system continues with step 252.

At step 252, the peripheral processor determines whether a communication time-out between the peripheral processor and the application processor has occurred. The peripheral processor periodically senses whether communication is present between the application processor and the peripheral processor. Upon the detection of no activity, a timer is started which, when upon time-out, indicates that communication between the application processor and the peripheral processor has been broken. If the answer at step 252 is affirmative, then control continues at step 256 as described above. If the answer to step 252 is negative, then control continues with step 254. The detection of a communication time-out also causes a reset to be sent from the peripheral processor to the application processor causing the later processor to be reset.

At step 254, the peripheral processor determines whether a reset condition has occurred. If a reset condition is present, then power to the oven must be disconnected. Reset occurs, for example, upon power-up of the system or upon detection of a communication time-out. If the answer at step 254 is affirmative, then the application processor executes step 256 as described above. If the answer to step 254 is negative, then the routine ends.

It will be understood by those skilled in the art that control functionality described in connection with the application processor and the peripheral processor can be varied. Thus, for example, the keyboard fault detection feature may be moved from the application processor to the peripheral processor or the detection of analog inputs may be moved from the peripheral processor to the application processor.

In addition, one skilled in the art will realize that many different sets of instructions or components can be used to implement any of the above algorithms in software or hardware. The exact details will vary depending upon, among other things, the exact processors used, the architecture of these processors, and the instruction sets used by the processors.

Figure 4:
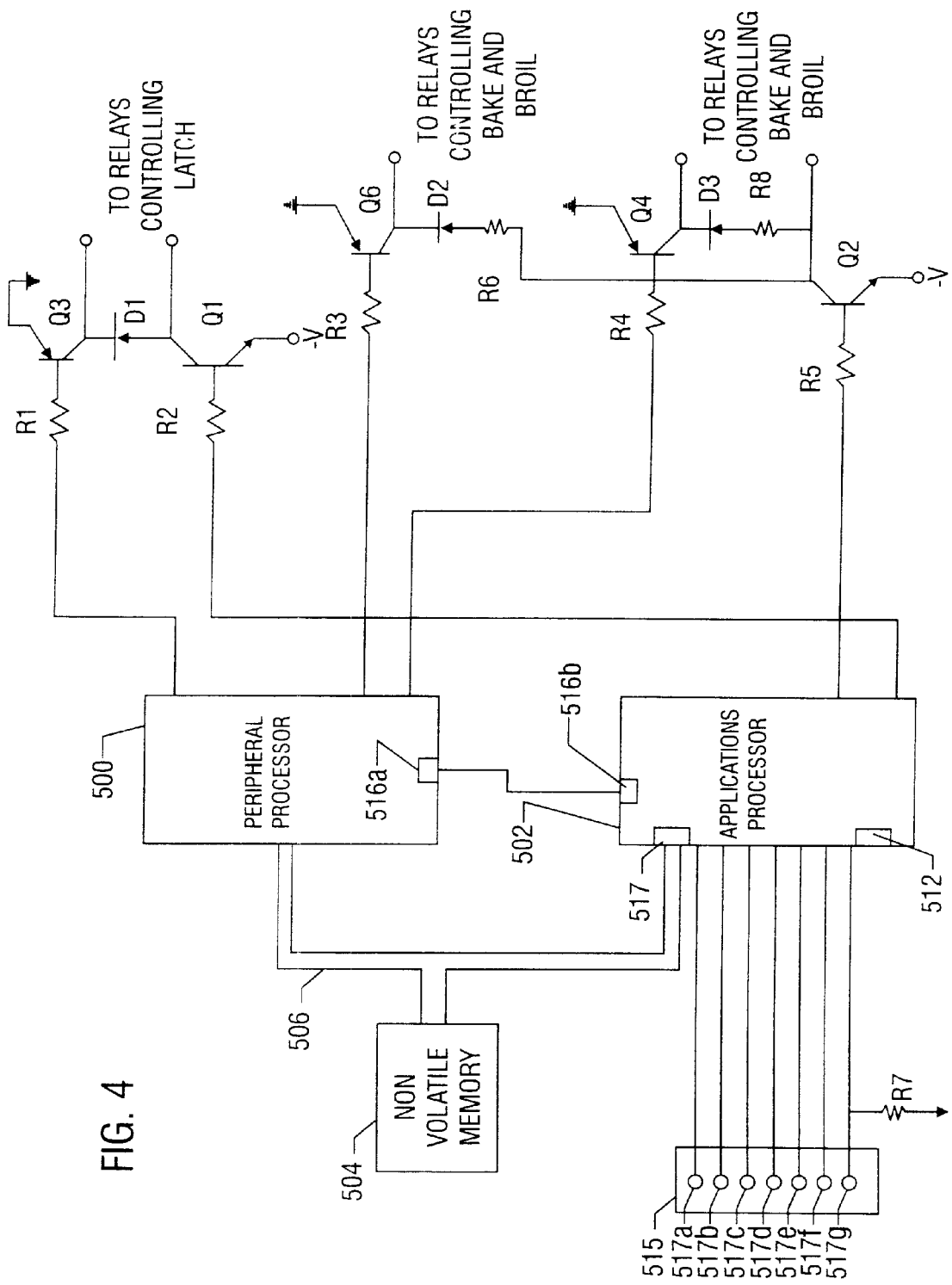
FIG. 4 is a schematic diagram of the control system according to principles of the present invention.

Referring now to FIG. 4, an application processor 502 and peripheral processor 500 are coupled to nonvolatile memory 504 which is the EEPROM memory. The memory 504 is connected to the processor 502 and 500 by a two wire bus 506. The bus 506 uses one line to send data and the other to send clock signals. Processor 502 controls the clock and is the master of the bus. It sends processor commands to either 500 or memory 504 by means of an unique digital address number. Input pin 517 of processor 502 has an analog-to-digital converter attached within processor 502 which is used to monitor the voltage of bus 506 to ensure that processor 502 and memory 504 are operating properly.

Processor 500 controls the bake and broil relays (not shown) by means of transistors Q4 and Q6. The activation of the relays is also controlled by processor 502 by means of transistor Q2. If an unsafe condition is detected by either processor 502 or 500, then the bake and broil operation can be terminated by deactivation (turning off) of Q4, Q6, and Q2.

The latching of the oven door is controlled by processor 500 by means of transistor Q3. The activation of the latch is also controlled by processor 502 by means of transistor Q1. Both processor 500 and processor 502 must agree that the latch control should be activated. This is necessary because transistor Q3 and Q1 are in series with the latch control relay. Resistors R1, R2, R3, R4 and R5 serve to bias the transistors as do resistors R6 and R8 and the diodes D1, D2 and D3.

A connector 515 is used to make electrical connection to the keyboard. A resistor R7 form a voltage divider through the keyboard cancel key. The connector 515 has a plurality of pins 517a–517g which can, for example, be coupled to keys of the keyboard of the appliance. For example, the cancel key can be coupled to pin 517g. When the cancel key is pressed, the voltage at pins 517g of connector 515 is pulled to ground and this is sensed by pin 512 of processor 502. Pin 512 of processor 502 is an analog-to-digital port of the processor and this can measure the actual voltage level produced by the voltage divider. If the keyboard were disconnected, the voltage at pin 12 of processor 502 would be at an abnormal level and the processor 502 would detect an unsafe condition such that a cancel switch may not be detectable. Under this condition, processor 502 would shut off the oven.

Pin 516a of processor 500 is used to control the reset input 516b of processor 502. The reset is asserted by processor 500 upon power up of the system or during a fault condition of processor 502.

While the present invention has been described with reference to one or more preferred embodiments, those skilled in the art will recognize that many changes may be made thereto without departing from the spirit and scope of the present invention.

What is claimed is:

1. A control system for preventing the occurrence of unsafe operating conditions on an appliance load comprising:
    first and second switch elements coupled to said appliance load;
    first controller means coupled to said first switch element for detecting a first predetermined fault condition and producing a first fault detection signal in response to said detection of said predetermined fault condition, said first fault detection signal deactivating said first switch element and de-energizing said load; and
    second controller means coupled to said second switch element for detecting a second predetermined fault condition and producing a second fault detection signal in response to said detection of said predetermined fault condition, said second fault detection signal deactivating said second switch element and de-energizing said load.

2. The control system of claim 1 where said first and second controller means are microprocessors.

3. The control system of claim 1 further comprising a keyboard, said keyboard coupled to said first controller means, wherein said first controller means senses the occurrence of a keyboard fault.

4. The control system of claim 1 wherein said first controller means activates said first switch element and wherein second controller means activates said second switch element whenever the voltage across said load is below a predetermined value.

5. The control system of claim 1 wherein said load is the heater unit of an oven.

6. A control system for detecting unsafe operating conditions in an appliance comprising:
    first and second switches coupled to said load such that the deactivation of one switch de-energizes said load;
    a memory containing predetermined unsafe operating conditions relating to said oven;
    a first controller coupled to said first switch and to said memory, said first controller sensing predetermined unsafe conditions in said appliance load and deactivating said first switch in response thereto; and
    a second controller coupled to said second switch and to said memory, said second controller sensing predetermined unsafe conditions in said appliance load and deactivating said second switch in response thereto.

7. The control system of claim 6 where said first and second controllers are microprocessors.

8. The control system of claim 6 further comprising a keyboard, said keyboard coupled to said first controller, wherein said first controller senses the occurrence of a keyboard fault.

9. The control system of claim 6 wherein said first controller activates said first switch and wherein second controller activates said second switch whenever the voltage across said load is below a predetermined value.

10. The control system of claim 6 wherein said load is the heater unit of an oven.

11. A method for preventing the occurrence of unsafe operating conditions on an appliance load comprising the steps of:
    coupling first and second switch elements to said appliance load,
    detecting a predetermined fault condition in a first controller;
    deactivating said first switch element and de-energizing said load in response to said detection;
    detecting a predetermined fault condition in a second controller; and
    deactivating said second switch element and de-energizing said load in response to said detection.

12. The method of claim 11 where said first and second controllers are microprocessors.

13. The method of claim 11 further comprising the steps of coupling a controller to said first controller sensing the occurrence of a keyboard fault using the first controller.

14. The method of claim 11 further comprising the steps of activating the first and second switch elements whenever the voltage across said load is below a predetermined value.

15. The method of claim 11 wherein said load is the heater unit of an oven.

16. A control system for use in a microwave oven comprising:
    a keyboard for receiving commands from a user;
    a first switch coupled to said load;
    a second switch coupled to said load;
    a memory for storing a plurality of predetermined voltage values;
    a first microprocessor coupled to said first switch, said memory, and said keyboard, said microprocessor detecting keyboard faults and processing user commands and opening said switch is response thereto and activating the first switch whenever the voltage across said load is below a selected one of said plurality of predetermined value; and a second microprocessor coupled to said second switch and said memory, said microprocessor senses whether the voltage level driving the load is below a threshold, said second microprocessor opening said switch is response thereto, said second microprocessor activating said second switch elements whenever the voltage across said load is below a predetermined value.

* * * * *

UNITED STATES PATENT AND TRADEMARK OFFICE
CERTIFICATE OF CORRECTION

PATENT NO. : 6,112,135
DATED : August 29, 2000
INVENTOR(S) : Gregory A. Peterson and Thomas J. Sheahan It is certified that error appears in the above-identified patent and that said Letters Patent is hereby corrected as shown below:

Title page,
Item [75], Inventors: Thomas A. Sheahan, delete the initial A. and insert "J."

Signed and Sealed this

Twentieth Day of November, 2001

Attest:

*Nicholas P. Godici*

NICHOLAS P. GODICI
*Attesting Officer*   *Acting Director of the United States Patent and Trademark Office*